T. L. Robinson,
Apparatus for Reducing Fish to Guano &c.
N° 42,310. Patented Apr. 12, 1864.
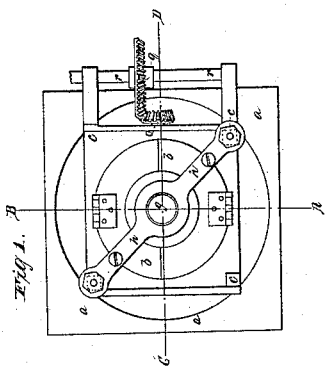
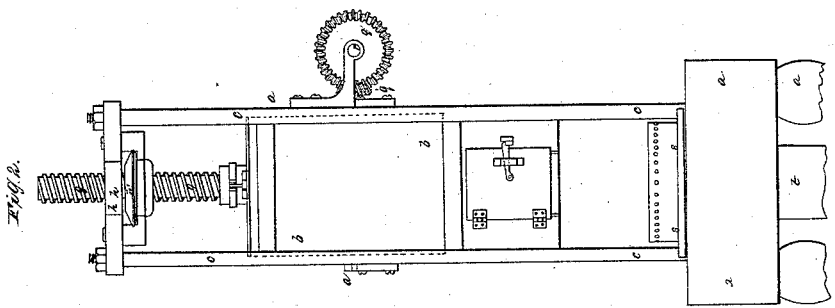
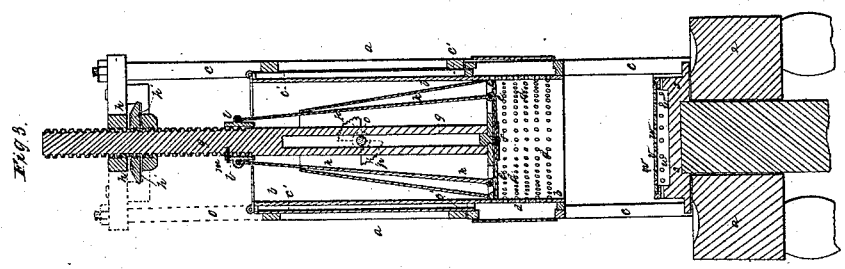
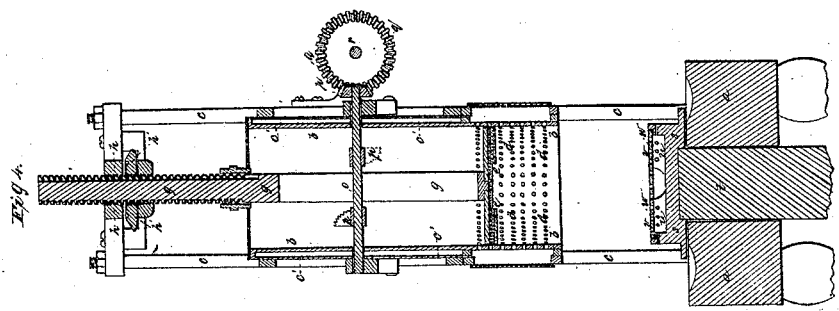
Witnesses
Albert W. Brown
Benjamin Mann
Inventor
Thos. L. Robinson

UNITED STATES PATENT OFFICE

THOMAS L. ROBINSON, OF BOSTON, MASSACHUSETTS.

IMPROVED APPARATUS FOR REDUCING FISH TO GUANO, &c.

Specification forming part of Letters Patent No. 42,310, dated April 12, 1864.

*To all whom it may concern:*

Be it known that I, THOMAS L. ROBINSON, of Boston, in the county of Suffolk and State of Massachusetts, have invented certain new and useful Improvements in Apparatus for Manufacturing "Fish-Guano," so called; and I do hereby declare that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

Among the many fertilizers now in use the most desirable, as well as most efficient, is the the "fish-guano," so called. The chemical analyzation of this guano has demonstrated that it is possessed of the most essential requisites for a fertilizer of the soil, and its use for this purpose has therefore been found to be of great importance.

In the preparation of this guano it is necessary that all oil and greasy matters should be thoroughly extracted from the fish, as their presence will cause putrefaction, and the accomplishment of this result, together with the other operations essential for preparing fish for use as guano, has heretofore been necessarily so expensive, from the manner in which they were performed, as in a great measure to prevent its use.

To prepare fish for guano the process has been to first steam or boil it, which opens the pores and allows the oil and greasy substances therein to be easily extracted by pressure, after which it is thoroughly disintegrated and dried; but in the carrying out of this process no organized apparatus has ever yet been used in and by which the desired result could be obtained, the various steps of the process being performed by separate and distinct operations— as, for instance, the fish was first placed in a steam-chamber to be steamed, then removed to a press for extracting the oil therefrom, &c., the disadvantages and inconvenience, as well as great expense, of which are evident, and need no particular mention here; therefore the present invention consists in a new and improved apparatus for accomplishing the economical manufacture of guano from fish, the essential feature of which is the combination in one apparatus of all the devices and means necessary to steam, press, and disintegrate the fish, it not being removed from the apparatus until manufactured into the guano desired.

The apparatus which I have invented, and which forms the subject of the present application for Letters Patent, is represented in the accompanying plate of drawings, of which—

Figure 1 is a plan or top view; Fig. 2, a side view; Figs. 3 and 4, central vertical sections taken, respectively, in plane of lines A B and C D, Fig. 1.

$a$ $a$ in the accompanying drawings represent the supporting frame-work of the apparatus; $b$ $b$, a vertical cylindrical vessel supported by and between the upright standards $c$ $c$ $c$ $c$ of the frame-work $a$ $a$.

Around the upper portion of the vessel $b$ $b$ a steam jacket or casing, $c'$ $c'$, is placed, to which steam is admitted in any proper manner, while the lower portion is pierced with a series of small apertures, $d$ $d$, &c.

$e$ $e$ is the bottom plate of the vessel $b$ $b$, made in two portions, hinged together at $f$ $f$, the diameter of which is less than the said vessel, so as to allow of its being moved up and down within the same at pleasure for purposes and by means of devices to be presently specified. $g$ $g$ is a vertical screw-rod placed within the center of the vessel $b$ $b$, having a bearing in the cross-bar $h$ of the frame-work $a$ $a$. To the lower end of this rod $g$ is attached the plate $e$, before referred to.

$h'$ is a screw-nut placed on the rod $g$ $g$, by turning which to the right or left the said rod $g$ $g$, and consequently the plate $e$ $e$, attached to the same, are made to rise or lower within the vessel $b$ $b$. $k$ $k$ are two vertical inclined rods on opposite sides of the screw-rod $g$ $g$, the lower ends of which are secured to the outer edge of the bottom plate, $e$ $e$, and the upper ends to a sliding collar, $l$ $l$, around the rod $g$ $g$.

By moving the collar $l$ $l$ up or down on the rod $g$ $g$, the bottom plate, $e$ $e$, turning on its hinge, is made to close or open, a pin, $m$, being used to secure said collar to the rod $g$ $g$.

Within the body of the vessel $b$ $b$ are serrated cutters $n$ $n$ $n$ $n$, attached to the horizontal transverse shaft $o$ $o$, having bearings at frame-work $a$ $a$. On this shaft $o$ $o$ is a gear-wheel, $p$, engaging with another gear, $q$, on the shaft $r$.

By turning the shaft $r$ the cutters $n$ $n$, &c., through the intermediate gears, $p$ and $q$, are made to revolve, as is apparent.

$s$ is a hollow follower attached to a rod, $t$. This follower $s$ is placed in the lower end of the cylinder, has perforations $u$ $u$, &c., on its sides, and in its top plate, $v$, perforations $w$ $w$, &c.

Having thus in detail explained the various devices composing my apparatus, I will now proceed to describe the manner in which the same is used for the manufacture of fish-guano.

The fish is first placed within the upper portion of the vessel $b$ $b$ and thoroughly heated by the steam admitted to the jacket $c'$ $c'$, at the same time the fish being disintegrated by the serrated revolving cutters $n$ $n$, &c.; but in order to bring all portions of the materials within the plane of revolution of the said cutters, the cutter-shaft being fixed, the screw-rod $g$ is raised or lowered by turning the nut $h'$, which thereby brings the bottom plate of the vessel $b$ nearer or farther from the said cutters. This steaming and cutting operation is continued until the material has been thoroughly softened and disintegrated, when the bottom of the vessel is opened, as described, and the material dropped out of the same into the perforated chamber $b$ $b$, in the bottom of which the plunger or follower $s$ $s$ has previously been placed. The bottom plate, $e$, is then closed and pressure applied to the plunger by any suitable means attached thereto, the plunger pressing and squeezing the material in its chamber up and against the bottom plate and perforated sides. This pressure extracts all oils, greasy matters, &c., contained in the fish, which pass out of the chamber $b$ through the many perforations thereof. The fish is then ready to be removed and dried.

It is evident from the above description that by my apparatus the steaming, disintegrating, and pressing of the fish is accomplished by one organized apparatus, which necessarily is more economical and advantageous than effecting the same result by several distinct operations.

It is also apparent that the raising and lowering of the fish material within the vessel $b$ $b$ and the revolving of the cutters $n$ $n$, &c., may be accomplished automatically.

There are also various ways in which the fish can be conveniently removed from the vessel—as, for instance, the perforated portion of the vessel $b$ can be hinged on one side, and, when desired, swung away from the main body of the vessel to a platform or to any proper receptacle for the material.

Having thus described my new apparatus, I shall state my claims as follows:

What I claim as my invention, and desire to have secured to me by Letters Patent, is—

1. Combining in one apparatus such arrangements of mechanical devices as will accomplish the several operations of heating or boiling, disintegrating, and expressing the oil from fish, as set forth.

2. Keeping the fish in such position with regard to the cutters as to cause it to be uniformly acted upon thereby by means of such feeding devices as will bring the cutters and body of fish in proper relations to each to accomplish the desired result, as described.

3. So constructing and operating the feeding-plate $e$ that it will serve both as a platen for the pressing devices to act against and also permit the material in the heating-vessel to be delivered to the pressure-chamber, as described.

4. The combination of a heating-vessel and disintegrating devices in the same apparatus, substantially as described.

5. The combination of a heating-vessel and devices for expressing oil from fish in one and the same apparatus, substantially as described.

6. The combination in one apparatus of devices for both pressing and disintegrating fish, substantially as described.

7. The use of serrated revolving cutters, operating as described, and for the purpose specified.

THOS. L. ROBINSON.

Witnesses:
  ALBERT W. BROWN,
  BENJAMIN MANN.